United States Patent [19]

Sato et al.

[11] 3,773,539

[45] Nov. 20, 1973

[54] METHOD OF PREPARING LIGHT-SENSITIVE PHOTOGRAPHIC MATERIAL WITH MANGANESE DIOXIDE LAYER

[76] Inventors: Shui Sato, Tomio Nakajima, Masayuki Shono, Shinobu Korematsu, all of Tokyo, Japan

[73] Assignee: Konishiroku Photo Industry Co., Ltd.

[22] Filed: Mar. 25, 1971

[21] Appl. No.: 128,167

[30] Foreign Application Priority Data
Mar. 26, 1970 Japan.............................. 45/24833
Mar. 26, 1970 Japan.............................. 45/24834

[52] U.S. Cl.................. 117/33.3, 96/84 R, 117/34, 252/300
[51] Int. Cl.............................................. G03c 1/84
[58] Field of Search...................... 96/84; 117/33.3, 117/34; 252/300

[56] References Cited

UNITED STATES PATENTS

| | | | |
|---|---|---|---|
| 2,614,928 | 10/1952 | Yutzy et al.......................... | 96/94 R |
| 3,630,739 | 12/1971 | Hine.................................... | 96/84 R |
| 3,332,792 | 7/1967 | Mackey............................... | 96/84 R |
| 2,095,018 | 10/1937 | Wilmanns et al................... | 96/84 R |

*Primary Examiner*—Ronald H. Smith
*Attorney*—Waters, Roditi, Schwartz & Nissen

[57] ABSTRACT

A colloidal manganese dioxide dispersion obtained by the reaction of potassium permanganate with a chemically modified gelatin is particularly useful in a light-sensitive photographic material. The gelatin is treated with a compound capable of reacting with the amino group of the gelatin, e.g. sulfonyl chlorides, carboxylic acid chlorides, acid anhydrides, isocyanates and 1,4-diketones. Undesired halation or irradiation can be effectively prevented.

2 Claims, No Drawings

METHOD OF PREPARING LIGHT-SENSITIVE PHOTOGRAPHIC MATERIAL WITH MANGANESE DIOXIDE LAYER

This invention relates to a light-sensitive photographic material in which a colloidal manganese dioxide pigment is used. More particularly, the invention pertains to a light-sensitive photographic material in which a colloidal pigmentary manganese dioxide is used which is prepared by reacting potassium permanganate with a modified gelatin.

Colloidal manganese dioxide dispersions are useful as a pigment for the antihalation of light-sensitive photographic materials. Accordingly, they have been thoroughly studied, and there have been already proposed processes for preparing them by reacting gelatin, gum arabic, polyvinyl alcohol, starch ether, a mixture of gelatin and citric acid, or the like with potassium permanganate. In carrying out these processes in practice, however, there are encountered various difficulties. For example, in the processes using gelatin, great increase in the viscosity of the reaction liquids is brought about during the course of the reaction. Further the resulting colloids have migrated, in most cases, with rubbery of film-like lumps. In the processes using material other than gelatin, the resulting colloids are unstable, and therefore fail to give a dispersion having a well controlled concentration. Further these colloids have migrated with lump-like substances, and stains are left even after bleaching in the fixing step. Thus, the colloids prepared according to the above-mentioned known processes have not been suitable for the antihalation of light-sensitive photographic materials.

The object of the present invention is to provide a light-sensitive photographic material in which a colloidal manganese dioxide dispersion is used which is free from such drawbacks as mentioned above.

As the result of extensive studies, we have found that when a modified gelatin is used, it is possible to obtain a colloidal manganese dioxide dispersion suitable for use as the antihalation layer of a light-sensitive photographic material.

As the gelatin to be modified, there may be used ordinary photographic gelatins such as those made from ossein or hide, and, for the modification of the gelatin, there may be used a compound which is capable of reacting with the amino group of the gelatin.

Examples of compounds suitable for the modification of gelatin which may be used in the present invention are enumerated below.

Sulfonyl chlorides:
1. Benzenesulfonyl chloride
2. p-Methoxybenzenesulfonyl chloride
3. p-Phenoxybenzenesulfonyl chloride
4. p-Bromobenzenesulfonyl chloride
5. p-Toluenesulfonyl chloride
6. m-Nitrobenzenesulfonyl chloride
7. Naphthalene-$\beta$-sulfonyl chloride
8. p-Chlorobenzenesulfonyl chloride
9. m-Carboxybenzenesulfonyl chloride
10. 2-Amino-5-methylbenzenesulfonyl chloride Carboxylic acid chlorides:
11. Phthalyl chloride
12. p-Nitrobenzoyl chloride
13. Benzyl chloride
14. Furoyl chloride
15. Methacryl chloride Acid anhydrides:
16. Phthalic anhydride
17. Benzoic anhydride
18. Succinic anhydride
19. Maleic anhydride
20. Itaconic anhydride
21. Methacrylic anhydride Isocyanates:
22. Phenyl isocyanate
23. p-Bromophenyl isocyanate
24. p-Chlorophenyl isocyanate
25. p-Nitrophenyl isocyanate
26. $\alpha$-Naphthyl isocyanate
27. $\beta$-Naphthyl isocyanate 1,4-Diketones:
28. Acetonylacetone
29. Dimethyl acetonylacetone
30. Diethyldiacetyl succinate Modification of the gelatin by use of the above-mentioned compounds may be carried out according to the method disclosed in U.S. Pat. No. 2,614,928. Particularly, phthalized gelatins are commercially available.

When a chemically modified gelatin is sued in the reduction of potassium permanganate, a colloidal manganese dioxide dispersion is obtained quite stably without fluctuation in concentration and further without deterio-rating any photographic properties.

The advantages attained in the case where a colloidal manganese dioxide dispersion is prepared by use of a modified gelatin are mentioned below with reference to the case where potassium permanganate and gelatin are reacted with each other according to the method disclosed in Kolloid-Zeitschrift, Vol. 19, page 241 (1916) and then the resulting reaction liquid is stabilized by addition of gelatin and manganese sulfate.

In reacting with potassium permanganate, a modified gelatin and an ordinary photographic gelatin greatly differ from each other in the degree of viscosity increase immediately after mixing of the two compounds.

In the case when an ordinary photographic gelatin is used, a marked viscosity increase is observed immediately after mixing with potassium permanganate. Particularly when the two compounds are reacted with each other at high concentrations, the whole reaction system is brought into the form of a lump which makes the stirring thereof difficult, so that the reaction is heterogeneous making it impossible to obtain a homogeneous colloid system even when a stabilization operation is effected subsequently.

On the other hand, in the case when a modified gelatin is used in place of the ordinary photographic gelatin in entirely the same reaction system as above, the viscosity increase brought about by mixing with potassium permanganate is so slight that the reaction system is substantially in the form of a liquid, and therefore, the reaction can be effected sufficiently homogeneously by weak stirring to make it possible to obtain a stable colloidal manganese dioxide dispersion.

Such difference becomes marked when the compounds used are high in concentration, and no homogeneous colloid system can be obtained unless a modified gelatin is used. The modified gelatin according to the present invention brings about no detrimental effect not only at the time of reaction with potassium permanganate, but also in various operations carried out for the purpose of stabilizing and desalting of the photographic emulsion and in the case where the resulting colloidal manganese dioxide dispersion is used to form a photographic antihalation layer. Moreover, the modified gelatin has many more advantages than in the case of ordinary gelatin. That is, in carrying out such desalting operation that a photographic emulsion is acidified to form a colloid-binder agglomerate, which is then washed with water and redispersed in a solution high in pH value, as is well known in the case of an ordinary photographic emulsion, the use of the modified gelatin results in such advantage that the operation can be effected without using any other reagent for precipitation. Further, in other desalting operations, e.g. in the case where a photographic emulsion is cold-set, water-washed and then redispersed, the use of the modified gelatin results in such advantage that it swells to a proper extent to make the dissolution thereof easy. In addition, the formation of film-like insoluble material which is frequently experienced can be alleviated, so that there are brought about no such drawbacks that insoluble material clog the filter used for the removal thereof or adhere, without being filtered, to the coated material.

The process of the present invention is effectively applicable to the case where potassium permanganate is reacted not only with the modified gelatine alone but in combination with citric acid, polyvinyl alcohol, gum arabic, glucose, etc. and with other reducing agents and protective colloids. The modified gelatin may be used not only in the above-mentioned reaction but also in place of gelatin used for stabilization and coating. Further, the resulting colloidal manganese dioxide dispersion may be incorporated, for coating or the like purpose, with a coating aid, a hardener, a colloid stabilizer, a dye, etc. The colloidal dispersion is dark brown and scarcely varies in color even when it is allowed to stand or is coated on a substrate. In view of the various characteristics as mentioned above, it will be easily understood that the thus obtained colloidal dispersion is useful as a photographic antihalation layer, a filter layer, an anti-irradiation layer, etc.

The following examples are the preferred embodiments of the present invention, but needless to say the present invention is not limited to these examples, and various modifications are possible within the scope of the invention.

EXAMPLE 1

A solution of 100 g. of photographic gelatin in 50 cc. of water was adjusted to pH 9.5 by addition of caustic soda. To this solution was added a solution of 5 g. of phenyl isocyanate in 40 cc. of acetone, and the resulting mixed solution was stirred at 60°C. for 20 minutes.

The reaction liquid was adjusted to pH 6.0, stirred at 45°C. and then mixed with 500 cc. of 3.5% potassium permanganate. After the mixing, the liquid gradually discolored from magenta color to dark brown. After complete discoloration, the liquid was charged with a solution of 30 g. of manganese chloride and 50 g. of photographic gelatin in 500 cc. of water, and then allowed to stand for 30 minutes. Subsequently, the liquid was cooled, allowed to stand overnight in a refrigerator kept at 2°C., redispersed and then washed with running water for 1 hour to obtain a colloidal manganese dioxide dispersion.

The thus obtained dispersion was incorporated with gelatin (for coating), a hardener, a plasticizer and a coating aid, and then coated on a cellulose triacetate base to a dry thickness of 6 $\mu$, whereby the film showed excellent properties as an antihalation layer for ortho-sensitized photographic materials usable in the graphic arts.

For comparison, the same procedures as above were repeated except that the gelatin was not modified with phenyl isocyanate. In this case, the liquid greatly increased in viscosity at the time when it was mixed with potassium permanganate, so that the stirring of the liquid became difficult. Further, the resulting colloidal dispersion migrated with insoluble agglomerates and hence was high in viscosity, and the coating of the dispersion was difficult.

EXAMPLE 2

The same gelatin solution as in Example 1 was adjusted to pH 10. To this solution was added an acetone solution containing 15 g. of phthalic anhydride, and the resulting mixed solution was treated for 30 minutes. Thereafter, the reaction liquid was adjusted to pH 6.0, and then mixed with 8 g. of glucose and 700 cc. of 3.5% potassium permanganate. Subsequently, the same operation as in Example 1 was effected to obtain an excellent colloidal manganese dioxide dispersion, which did not clog a 350 mesh filter.

The thus obtained dispersion was coated on a cellulose triacetate base in the same manner as in Example 1, whereby an excellent antihalation layer was formed.

Example 3

Example 1 was repeated except that each of 10 g. of p-toluenesulfonyl chloride, 10 g. of benzoyl chloride and 15 g. of acetonylacetone was used in place of the phenyl isocyanate to prepare a colloidal manganese dioxide dispersion. The thus prepared dispersion was coated on a triacetate base in the same manner as in Example 1, whereby an excellent antihalation layer was formed.

What we claim is:

1. A method of producing a light-sensitive photographic material comprising reacting gelatin with a member selected from the group consisting of sulfonyl chlorides, carboxylic acid halides, carboxylic acid anhydrides, aromatic isocyanates, and 1–4 diketones to form a modified gelatin, reacting potassium permanganate in an aqueous solution with the modified gelatin to form a stable colloidal manganese dioxide dispersion and applying said dispersion as an anti-halation layer on a light sensitive photographic material.

2. A method as claimed in claim 1 comprising coating a transparent base support with the dispersion before application to said photographic material.

* * * * *